United States Patent [19]
Allen et al.

[11] Patent Number: 6,112,143
[45] Date of Patent: Aug. 29, 2000

[54] METHOD AND APPARATUS FOR ESTABLISHING A PERIMETER DEFINING AN AREA TO BE TRAVERSED BY A MOBILE MACHINE

[75] Inventors: William E. Allen, Peoria; John P. Sewell, Aurora, both of Ill.

[73] Assignee: Caterpillar Inc., Peoria, Ill.

[21] Appl. No.: 09/130,265

[22] Filed: Aug. 6, 1998

[51] Int. Cl.[7] .......................... G01C 22/00; G01C 21/00; G05D 1/00; G06G 7/78; H04D 7/185

[52] U.S. Cl. .............................. 701/25; 701/26; 701/209; 701/210; 701/213; 701/215; 342/357.13; 342/357.17

[58] Field of Search ............... 342/357.13, 357.17, 342/457; 340/990, 995; 701/25, 26, 50, 209, 210, 213, 215, 300; 180/168

[56] References Cited

U.S. PATENT DOCUMENTS

| | | | |
|---|---|---|---|
| 4,600,999 | 7/1986 | Ito et al. . | |
| 4,674,048 | 6/1987 | Okumura . | |
| 5,204,814 | 4/1993 | Noonan et al. | 364/424.02 |
| 5,471,391 | 11/1995 | Gudat et al. | 364/424.07 |
| 5,493,494 | 2/1996 | Henderson | 364/424.07 |
| 5,631,658 | 5/1997 | Gudat et al. | 342/457 |
| 5,646,844 | 7/1997 | Gudat et al. | 364/449.2 |
| 5,684,476 | 11/1997 | Anderson . | |
| 5,974,347 | 11/1999 | Nelson | 701/25 |

FOREIGN PATENT DOCUMENTS

| | | |
|---|---|---|
| 04907436A2 | 12/1991 | European Pat. Off. . |
| 0821296A2 | 1/1998 | European Pat. Off. . |
| WO 98/19514 | 5/1998 | WIPO . |

*Primary Examiner*—Thomas H. Tarcza
*Assistant Examiner*—Fred H. Mull
*Attorney, Agent, or Firm*—Haverstock Garrett & Roberts; Steve D. Lundquist

[57] ABSTRACT

In one embodiment of the present invention, an apparatus and method for establishing the perimeter of a work site for a mobile machine capable of operating autonomously or semi-autonomously includes activating a learning mode, positioning the mobile machine at a plurality of locations on the perimeter, and recording position data at each location from a sensor system, such as GPS, that provide signals corresponding to the position of the mobile machine. The position data is stored and a data processor associated with a control system generates a display of the perimeter so that an operator may visually verify the size, location, and shape of the work area bounded by the perimeter. Means to allow the operator to modify the entered position data is also provided.

13 Claims, 5 Drawing Sheets

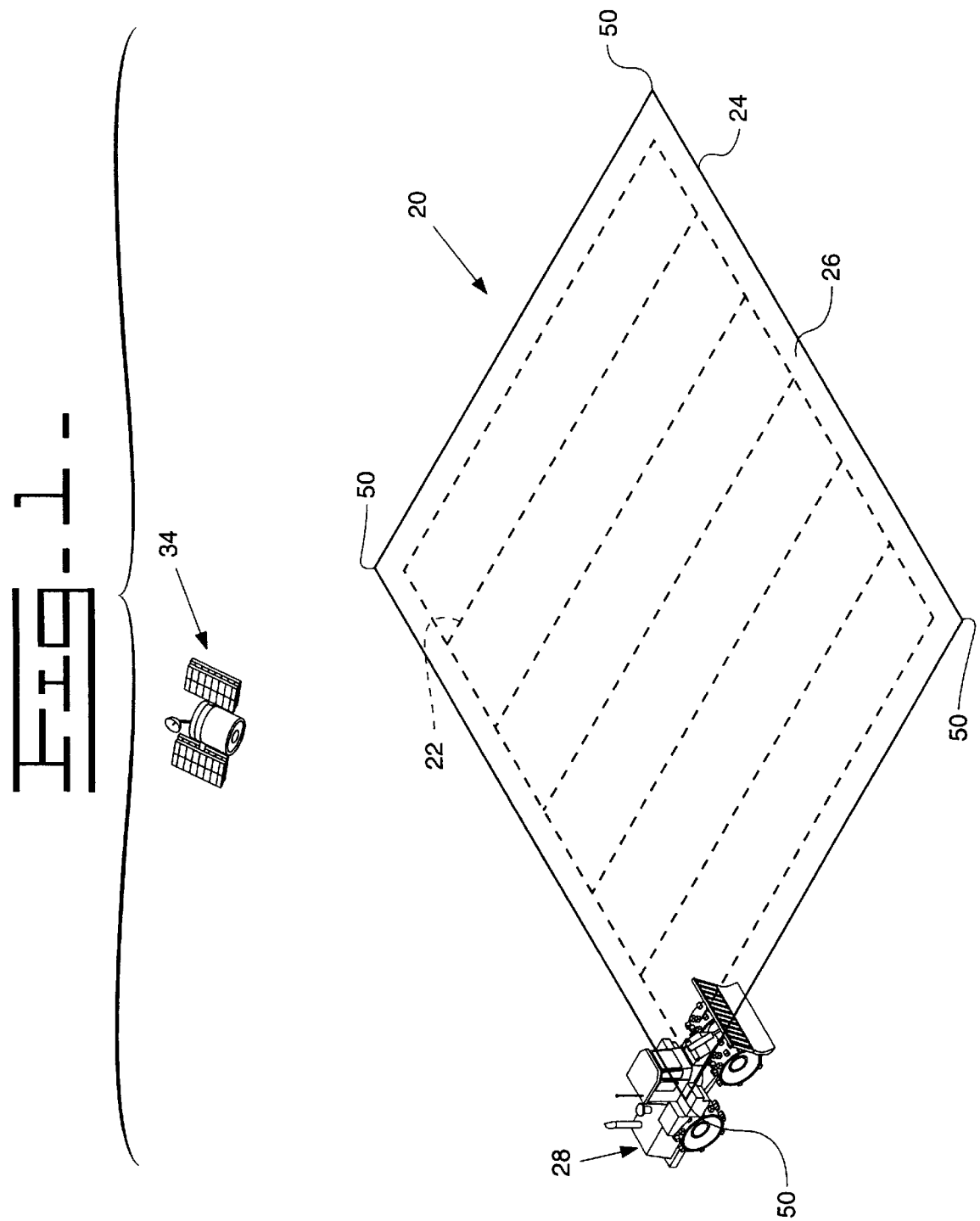

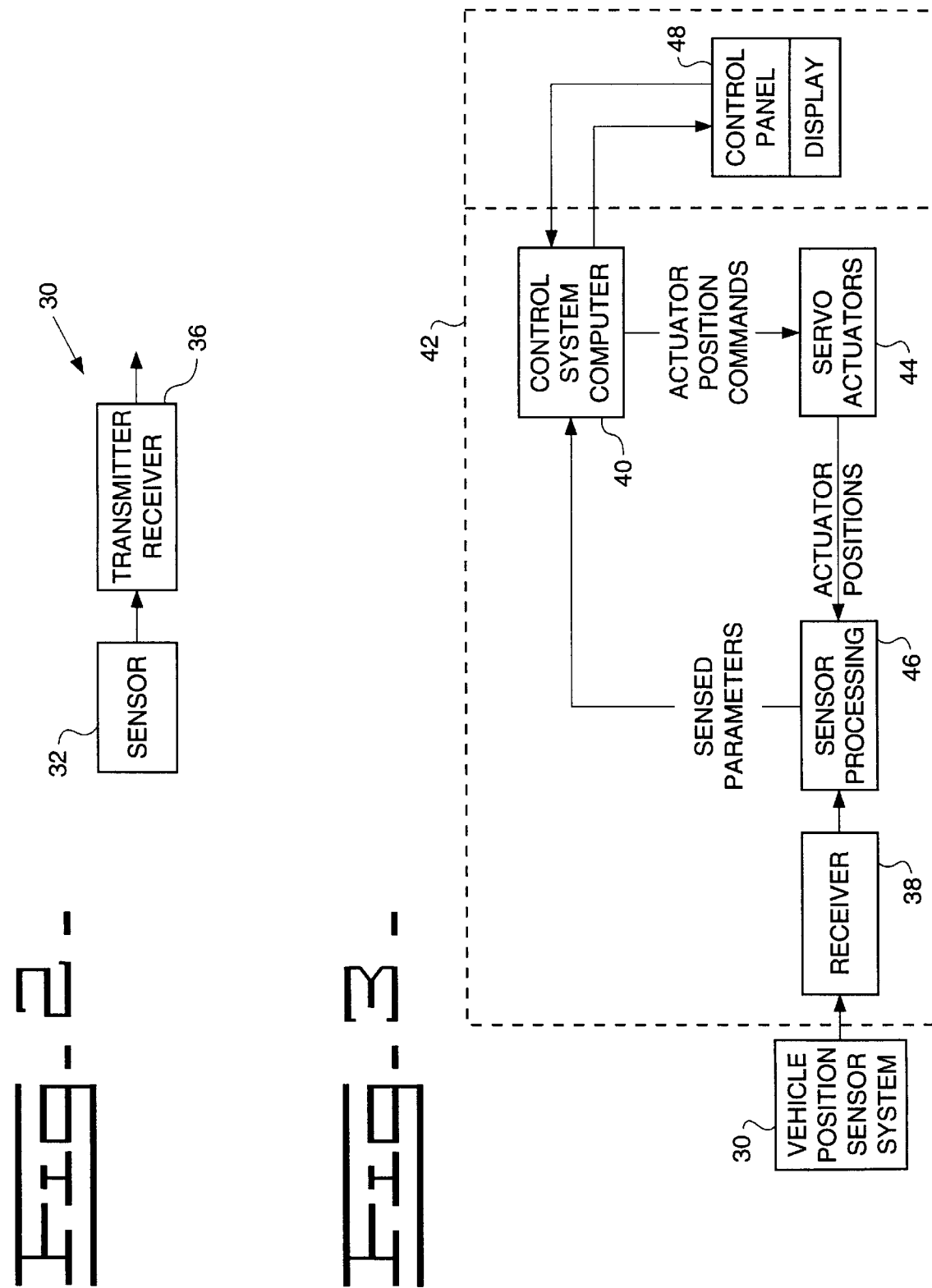

METHOD AND APPARATUS FOR ESTABLISHING A PERIMETER DEFINING AN AREA TO BE TRAVERSED BY A MOBILE MACHINE

TECHNICAL FIELD

The present invention relates generally to the operation of a mobile machine for traversing an area of a work site and, more particularly, to a method and apparatus for establishing the perimeter of an area to be traversed by a mobile machine.

As used in this patent specification the phrase "mobile machinery" and various approximations thereof refer to self-propelled machines such as track-type tractors, road graders, pavers asphalt layers, agricultural machinery, compactors, and the like, which exhibit both (1) mobility over or through a work site, and (2) the capacity to alter the topography or appearance of a work site with a tool or operative portion of the machine such as a bucket, shovel, blade, ripper, compacting wheel and the like.

BACKGROUND

There is an increasing demand to automate moving machinery that traditionally requires a human operator. There are several reasons for this. Unlike a human operator, automated machinery remains consistently productive regardless of environmental conditions and prolonged work hours. Automated machinery is also ideal for applications where conditions are unsuitable or undesirable for humans. Further, automated machinery enables more accurate operation and compensates for lack of operator skill.

The work cycles of different types of machines may include similar requirements. Some machines, including earth, asphalt, and trash compactors, repeatedly traverse a site until the material is compressed to the desired degree. During autonomous operation, these machines require means to determine their position, the area to be traversed, an optimal path to follow while traversing the area, and means to control their movement while traversing the path.

In the prior art, a site survey is typically conducted manually using line-of-sight optical instruments or other static, point by point measuring techniques. Thereafter, the site is carefully marked with stakes to provide visual cues to the operator of the machinery. Systems for achieving a desired degree of compaction or desired site topography with mobile terrain-shaping and material compacting machinery are disclosed in U.S. Pat. Nos. 5,631,658; 5,493,494; 5,471,391; and 5,646,844. In these patents, the actual site topography is determined on a continual basis using a global positioning system on the machine to provide information regarding the position of the machine in space. Using the position of the machine, the actual topography of the terrain is updated as the machine traverses the work site and the difference between the actual site topography and the desired site topography is determined on a continual basis. This information is provided to an operator via a real-time graphical display to provide visual cues for operating the machine over a work site. The prior art methods do not, however, disclose means for establishing a perimeter of the work area to be used by a mobile machine that is capable of traversing the work area autonomously. Further, with autonomous machinery, the boundaries of the work area must be provided in a manner that is usable by a computer-based planning and navigation system that determines the paths for the machine to traverse.

Accordingly, the present invention is directed to overcoming one or more of the problems as set forth above.

DISCLOSURE OF THE INVENTION

In one embodiment of the present invention, an apparatus and method for establishing the perimeter of a work site for a mobile machine capable of operating autonomously or semi-autonomously includes activating a learning mode, positioning the mobile machine at a plurality of locations on the perimeter, and recording position data at each location from a sensor system, such as GPS, that provides signals corresponding to the position of the mobile machine. The position data is stored and a data processor associated with a control system generates a display of the perimeter so that an operator may visually verify the size, location, and shape of the work area bounded by the perimeter. Means to allow the operator to modify the position data entered is also provided.

BRIEF DESCRIPTION OF THE DRAWINGS

FIG. 1 is a top plan view of a work area having a plurality of work paths;

FIG. 2 is a functional block diagram of a sensor system for providing position data;

FIG. 3 is a functional block diagram used to carry out the present invention including a control system for a mobile machine;

BEST MODE FOR CARRYING OUT THE INVENTION

Figure 4:
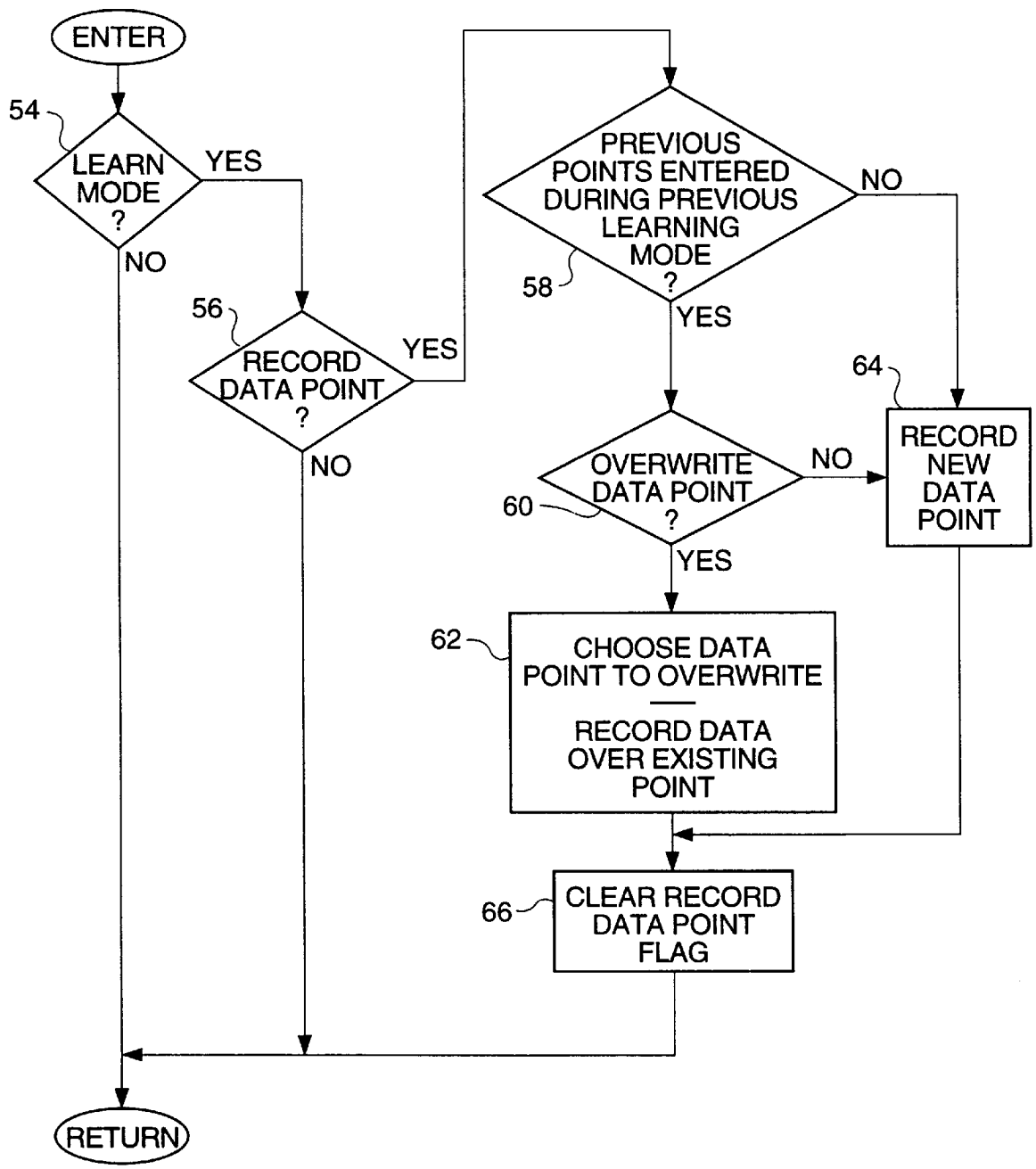
FIG. 4 is a flowchart diagram of a learning mode associated with the present invention.

Referring to FIG. 1, a top plan view of a work area 20 is shown having a plurality of work paths 22 bounded by a perimeter 24. A cushion boundary 26 is included between work paths 22 and the perimeter 24 so that small inaccuracies in data provided by sensor systems do not interfere with the present invention as described hereinbelow. The work paths 22 are exemplary of the manner in which the work area 20 may be divided where a task such as material compacting is performed by a mobile machine 28. It should be noted that a wide variety of patterns may be used to divide the work area 20 into work paths 22. Some factors for selecting a particular pattern include the area covered during one pass of the mobile machine 28, the turning radius of the mobile machine 28, and the size of the work area 20. The present invention is applicable to tasks that involve traversing the work area 20 only once or several times, such as material compaction.

The present invention for establishing the perimeter of a work area for the mobile machine 28 involves positioning the mobile machine 28 at one location on the perimeter 24 as shown in FIG. 1. The work area 20 may have any shape as dictated by factors such as property boundaries or area on which the task is to be performed. The work area 20 is shown in FIG. 1 as a rectangle for illustrative purposes only and is not meant to limit the present invention to work areas having a particular shape.

The present invention includes means to generate signals representing the instantaneous position in at least two-dimensional space of a portion of the mobile machine 28. Such means, as shown in FIG. 2, include various vehicle position sensor systems 30 capable of providing information regarding the position of the mobile machine 28 in two-dimensional or three-dimensional space. Several different types of sensors 32 are suitable for use in such sensor systems 30 including, but not limited to, inertial gyros, lasers, global positioning systems (GPS), GPS/laser combinations, and radar. In certain types of sensor systems 30, such as the GPS satellite 34 shown in FIG. 1, position data is transmitted to a receiver 38. The receiver 38 is in communication with a sensor processing module 46 that provides sensor data to control system computer 40 as shown in control system 42 in FIG. 3.

The control system computer 40 includes a data processor, such as a microprocessor, random access memory, read only memory, and a data bus for receiving data from and transmitting data to various devices. The control system computer 40 executes logic and equations implemented in one or more software programs to determine actuator position command signals for operating various pumps, valves, hydraulic cylinders, motor/steering mechanisms and other servo-actuated controls for controlling movement of the mobile machine 28. Servo-actuators 44 receive position commands but typically are not capable of moving to the commanded position instantaneously. Actual actuator positions are sensed and input to the sensor processing module 46 that conditions the sensor signals for use by the software programs of the control system 42. The mobile machine's position data from the vehicle position sensor system 30 may also be conditioned by the sensor processing module 46, which filters noise from the signals and performs any other processing required. The sensor processing module 46 may be implemented in software that is executed in a computer, such as the control system computer 40, or it may be implemented with electronic circuitry. Sensed parameters from the sensor processing module 46 are input to the control system computer 40 for use by the software programs.

An operator may also input data, commands, or other information via control panel 48. The control panel 48 consists of input means such as a keyboard, switches, buttons, and dials, and interface means such as an analog to digital or digital to analog converter operatively connected to communicate with the control system computer 40. The control panel 48 also includes audio and visual display means such as a cathode ray terminal (CRT), light emitting diode readouts, lights, sounds, alarms, and the like to provide information to an operator.

To establish the perimeter 24 of the work area 20, the mobile machine 28 is positioned at any location on the perimeter 24. It is most advantageous to position the mobile machine 28 at a corner point 50 to reduce the number of data points that must be collected to establish the perimeter 24. When the mobile machine 28 is positioned at the desired location, the operator inputs a command to the control panel 48 to record the position of the mobile machine 28. The control panel 48 transmits the command to the control system computer 40. The position data may be available from the vehicle position sensor system 30 continually or as requested. If the position data is available continually, the current data is recorded in the control system computer 40. If the position data is only available upon request, the control system computer 40 transmits the command to the vehicle position sensor system 30 to provide the position data of the mobile machine 28 at the current position of the mobile machine 28. The position data is transmitted to the sensor processing module 46, conditioned, and then input to the control system computer 40. The position data may be available from the sensor system 30 in two-dimensional or three-dimensional coordinates. The mobile machine 28 is then driven to another location along the perimeter 24 such as the next corner point 50. The operator once again inputs a command to record the position of the mobile machine 28. The operator moves the mobile machine 28 to as many locations as desired or required along the perimeter 24 to record position data that defines the work area 20. The position data is used in a software program in the control system computer 40 that plans work paths 22 for the mobile machine 28 to follow while performing the task.

In order to cue the control system 42 that position data to establish the perimeter 24 is about to be collected, the control panel 48 may include an operator interface that allows the operator to put the control system 42 in a learn mode via a switch or other input device. FIG. 4 shows a flowchart representation of learning mode logic that may be implemented in software on the control system computer 40. In decision block 54, it is determined whether the learn mode is selected. If so, then in decision block 56, it is determined whether the operator has commanded the current position data to be recorded. If so, then the logic may include a test in decision block 58 to determine whether points were entered during a previous cycle of the learning mode. If so, then the points may be displayed and the operator may be given the option of overwriting an existing point or entering a new one as shown in decision block 60. If the operator chooses to overwrite an existing data point, then the current position data overwrites the stored data point chosen by operator as shown in block 62. Otherwise a new data point is entered as shown in block 64. The operator may be given the option to enter the new data point at the beginning or end of the other data points, or to insert it between two of the other points. Once the data is recorded, the record data flag is cleared as shown in block 66. The control panel 48 may include means to allow the operator to verify the established perimeter 24, such means including an operator display showing a graphic display of the perimeter 24 along with the coordinates of the data points. The display may also include a readout of the square footage associated with the work area 20 bounded by the perimeter 24, as well as other pertinent information as desired. Means such as a light pen or other pointing device may be provided to interact with the displayed perimeter to allow the operator to indicate a correction for a point or to enter a new point for the perimeter.

INDUSTRIAL APPLICABILITY

The present invention for establishing the perimeter 24 of the work area 20 may be advantageously used in a system for autonomous control of a mobile machine 28. The principles and applications of the present invention lend themselves to virtually any mobile machine 28 that traverses a work area 20 while performing a task. Such mobile machinery may be equipped in known fashion with an electro-hydraulic control system 42 as discussed hereinabove. The control system 42 for autonomous mobile machinery 28 includes several software programs that may be executed in the control system computer 40. These software programs include a work planner for generating work paths 22, a path planner for planning transitions between the work paths 22, and a path follower for determining which way to steer the mobile machine 28 to follow the work paths 22. These software programs require knowledge regarding the perimeter 24 of the work area 20 for various reasons including to avoid trespassing on another's property or to avoid operating the mobile machine 28 in undesirable areas such as near the edge of cliffs, lakes, or obstacles. The control system 42 may also generate the cushion boundary 26 once the perimeter 24 is established which provides a further buffer in the event that sensor system 30 provides position data containing errors due to inaccuracies in the sensor system 30.

Figure 5:
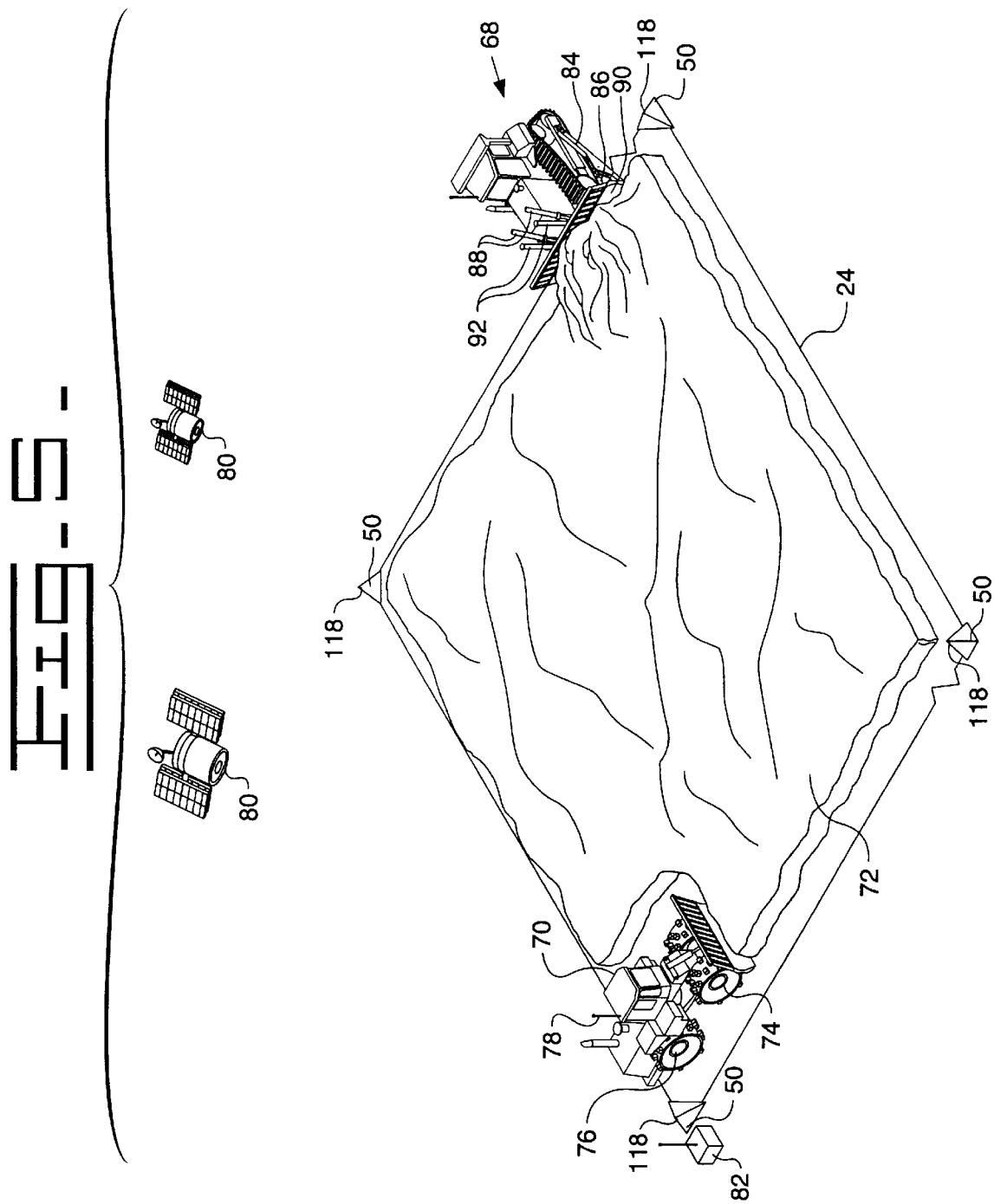
FIG. 5 is a perspective view of a work site.

Referring to FIG. 5, a landfill compacting system including two mobile machines 68, 70 are shown on location at a landfill site 72. In the illustrative embodiment of FIG. 5, one mobile machine is a track-type tractor 68 that spreads material to be compacted over the landfill site 72 and the other mobile machine is a wheeled landfill compactor 70 that compacts the material spread by the tractor 68. It will become apparent however, that the principles and applications of the present invention will lend themselves to virtually any mobile tool or machine with the capacity to move over or through a work site and alter the topology of the site in some fashion.

Compactor 70 is equipped with electro-hydraulic control system 42 as shown in FIG. 3 capable of outputting commands for autonomous or semi-autonomous operation of the mobile machinery. These controls operate, for example, steering, brake, throttle, blade, and motor controls. Compactor 70 includes two spaced front wheels 74 which can be turned to control the direction of the compactor 70, and two spaced rear wheels 76 which are fixed relative to the body or frame of compactor 70. The compactor wheels 74, 76 have wide, studded surfaces capable of compacting waste and trash in a landfill in known fashion. Compactor 70 is heavy, and may be weighted to increase the compacting force exerted by the wheels on the material which they traverse.

Tractor 68 and compactor 70 are equipped with positioning systems capable of determining the respective positions of the machines with a high degree of accuracy. In a preferred embodiment, aspects of the method and apparatus of the present invention are realized through utilization of three-dimensional position information derived from a GPS sensor system using a phase differential GPS receiver. Such GPS receivers utilize signals generated by global positioning satellites as well as a differential signal from a base station having a reference receiver of known position coordinates to generate position coordinate data to within known accuracy. In FIG. 5 the compactor's position system includes a GPS receiver 78 located on the compactor 70 at fixed, known coordinates relative to the site-contacting portions or footprints of the wheels. The GPS receiver 78 receives position signals from a GPS constellation 80 and uses differential correction signals from GPS base station 82 to accurately determine its position in two or three-dimensional space. Alternatively, raw position data can be transmitted from base station 82 and processed in known fashion by the machine-mounted GPS position system.

Tractor 68 is equipped in known fashion with available hydraulic or electro-hydraulic tool controls that operate, among other things, push arm 84, tip/pitch cylinders 86, and lift cylinders 88 to maneuver blade 90 in three dimensions for desired cut, fill and carry operations. The tractor's positioning system is capable of determining the position of the tractor 68 and/or the blade 90 of the tractor 68 with a high degree of accuracy. In FIG. 5 the position system includes a phase differential GPS receiver 92 located on the machine at fixed, known coordinates relative to the blade 90 or some other known location on the tractor 68. Machine-mounted receiver 92 receives position signals from the GPS constellation 80 and uses a differential correction signal from GPS base station 82 to accurately determine the tractor's position in two or three-dimensional space. Alternatively, raw position data can be transmitted from base station 82 and processed in known fashion using a data processor to determine the tractor's position.

Figure 6:
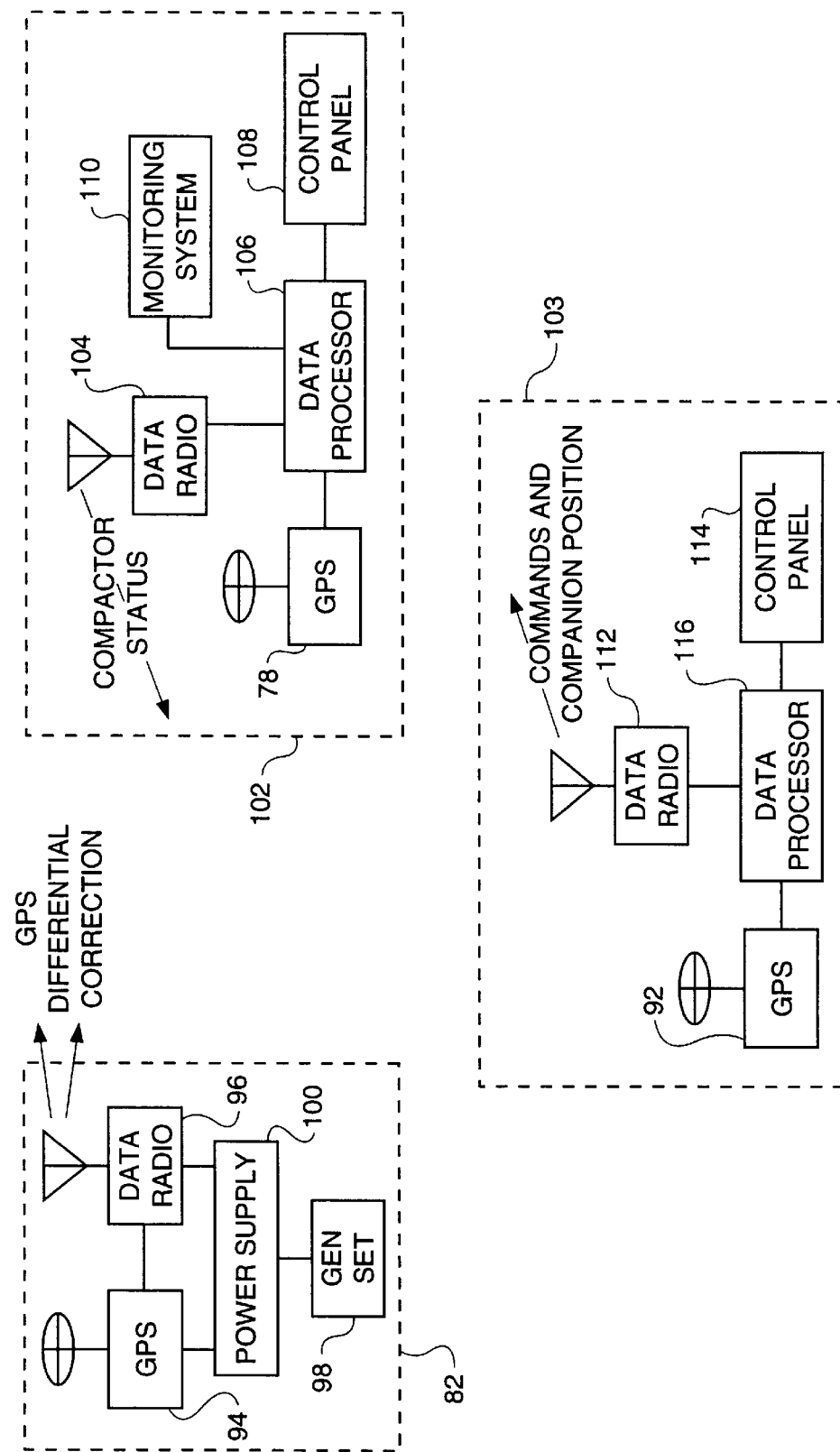
FIG. 6 is a functional block diagram of a communication system for implementing the present invention.

FIG. 6 shows a functional block diagram of the components included in the base station 82, a control station 102 for the compactor 70, and a control station 103 for the tractor 68. The base station 82 includes a GPS receiver 94, a data radio 96, a portable electric generator set 98, and a power supply 100. These components are packaged together and are located in proximity to the work area. The compactor's control station 102 includes the phase differential GPS receiver 78, data radio 104, data processor 106, control panel 108, and monitoring system 110. The tractor operator's control station 103 includes GPS receiver 92, a data radio 112, a control panel 114, and data processor 116. Data processors 106, 116 may be part of the control system computer 40 shown in FIG. 3. The components in the base station 82, and the control stations 102, 103 provide communication means for the compactor 70 to operate autonomously in concert with tractor 68, which, preferably, is operator-driven, as described hereinbelow.

During a start-up phase, an operator drives the compactor 70 to a corner 50 of landfill site 72 and uses means on control panel 108, such as a switch or data entry via a keyboard, to put the compactor 70 in autonomous mode. The operator unloads the mobile GPS base station 82, positions it at the selected location, and places it in an operational mode by starting the generator set 98. The operator then confirms operational status of the compactor 70 in autonomous mode via a display associated with control panel 108, as well as operation of the GPS base station 82.

The operator then activates the learning mode as described hereinabove and begins driving the compactor 70 around the perimeter 24 of the work area 20. At each corner 50 of the work area 20, as well as at any desired intermediate points, the operator activates means via control panel 108 to cue the system that the present location should be entered as a point defining the perimeter 24. The operator may place a marker 118 such as a stake or buoy at each corner to provide a visual perimeter cue to the operator of the tractor 68. Upon completion of entering the corners 50 of the perimeter 24 in the system, the operator exits the learning mode and verifies the completion and correct entry of the perimeter 24. The control system computer 40 then calculates the compaction area and determines a work path or series of work paths 22 for the compactor 70 to traverse. For example, with a landfill site 72, the travel plan will be a repetitive, systematic back and forth series of work paths 22 to allow the compactor 70 to uniformly traverse the landfill site 72 and compact the material. The work paths 22 are traversed repeatedly as long as the compactor 70 is activated.

The operator takes further steps to put the compactor 70 in operational mode including lowering the blade 90, setting a parking brake, and confirming that the compactor 70 is ready to begin autonomous operation. The operator then exits the machine and boards the tractor 68. The tractor 68 spreads material to be compacted over the landfill site 72 ahead of the path of the compactor 70. The planned motion of the compactor 70 along the work paths 22 and the position of the tractor 68 with respect to the compactor 70 may be shown on a display associated with the tractor's control panel 114. The tractor 68 may be driven by the same operator responsible for the operation of the compactor 70 while the compactor 70 is operating in the autonomous mode.

The status of the compactor 70 is transmitted via the data radio 104 associated with the compactor's control panel 102 to the tractor 68 so the operator can monitor operation and position of the compactor 70. Further, the control system 42 of the compactor 70 may include features that receive commands, tractor status, and tractor position from the data radio 112 associated with the tractor's control panel 103. This provides the operator with means to start and stop the compactor 70 from the tractor 68 and to perform any other functions deemed necessary to complete the task. The compactor's monitoring system 110 monitors the position of the tractor 68 and controls the movement of the compactor 70 with respect to the position and movement of the tractor 68. The monitoring system 110 further keeps track of the position of the compactor 70 and may be designed to perform some action if a specified condition is detected, such as stopping the compactor 70 if it traverses outside the perimeter 24.

The present invention for establishing the perimeter 24 of a work site 20 thus provides means for an autonomous mobile machine to learn the desired boundaries or perimeter of operation. It is further anticipated that a mobile machine may be remotely controlled to traverse the perimeter and to enter the coordinates of the corner points 50 in the control system 42 instead of requiring an operator to be onboard the mobile machine during the learning mode. The desired functions may be included entirely in one mobile machine, thereby obviating the need for a companion vehicle such as the tractor 68 and compactor 70 combination.

Other aspects, objects and advantages of the present invention can be obtained from a study of the drawings, the disclosure and the appended claims.

What is claimed is:

1. A method for establishing a perimeter of a work area for a mobile machine, the method comprising the steps of:
   a) positioning the mobile machine at one location on the perimeter;
   b) generating signals representing the instantaneous position in at least two-dimensional space of a portion of the mobile machine;
   c) activating means for receiving the position signals in a data storage and retrieval means;
   d) positioning the mobile machine at another location on the perimeter;
   e) repeating steps b) through d) until the mobile machine is positioned at a final location on the perimeter; and
   (f) planning a pattern of work paths of the work area by a control system computer located on the mobile machine, the pattern of work paths being a function of the perimeter, the work area, and the mobile machine.

2. The method, as set forth in claim 1, wherein the position signals are generated by a GPS sensor system.

3. The method, as set forth in claim 1, wherein the locations correspond to corners of the perimeter.

4. An apparatus for establishing a perimeter of a work area for a mobile machine, the apparatus comprising:
   the mobile machine positioned at a plurality of locations on the perimeter;
   means for generating signals representing the instantaneous position in at least two-dimensional space of a portion of the mobile machine at each location;
   means for receiving and storing the position signals; and
   a control system computer located on the mobile machine and adapted to plan a pattern of work paths of the work area as a function of the perimeter, the work area, and the mobile machine.

5. The apparatus, as set forth in claim 4, wherein the means for generating position signals is a GPS sensor system.

6. The apparatus, as set forth in claim 4, wherein the locations correspond to corners of the perimeter.

7. The apparatus, as set forth in claim 4, further comprising a data processing system including a learning mode that associates the stored position signals with the perimeter.

8. The apparatus, as set forth in claim 7, further comprising means for verifying the established perimeter.

9. The apparatus, as set forth in claim 8, wherein the means for verifying the established perimeter includes an operator display.

10. A system for establishing a perimeter of a work area for an autonomous mobile machine comprising:
    a positioning system operable to provide coordinate data corresponding to the position of the mobile machine as the mobile machine traverses the work area; and
    a control system located on the mobile machine having a data processor operatively connected to data storage means, program means including a learning mode, the learning mode being operable to enter position data corresponding to points on the perimeter of the work area as the mobile machine traverses the perimeter, and to store the position data in the data storage means, the control system further having a work planner for generating work paths.

11. The system, as set forth in claim 10, further comprising:
    a display; and
    the data processor being operable to generate output to the display to allow the operator to verify the position data entered to establish the perimeter.

12. The system, as set forth in claim 11, wherein the data processor is further operable to receive input from the operator to modify the position data entered during the learning mode.

13. A system, as set forth in claim 10, wherein the control system further includes:
    a path planner for planning transitions between the work paths; and
    a path follower for determining a direction to steer the mobile machine to follow the work paths.

* * * * *